June 10, 1924.

G. LEHR

PATCH CLAMP FOR TIRES AND THE LIKE

Filed Oct. 7, 1922

1,497,297

Inventor
Gustave Lehr
George W. Khan
his Attorney

Patented June 10, 1924.

1,497,297

UNITED STATES PATENT OFFICE.

GUSTAVE LEHR, OF BROOKLYN, NEW YORK.

PATCH CLAMP FOR TIRES AND THE LIKE.

Application filed October 7, 1922. Serial No. 592,970.

*To all whom it may concern:*

Be it known that I, GUSTAVE LEHR, a citizen of the United States, and resident of the borough of Brooklyn, in the county of Kings and State of New York, have invented certain new and useful Improvements in Patch Clamps for Tires and the like, of which the following is a specification.

My present invention relates to patch clamps for rubber tires, shoes and the like, of the type comprising a head to be inserted within the tire cavity through a puncture or cut that is to be repaired, a screw shank to extend through the puncture and a thin disk-like nut screw threaded upon the shank into air tight engagement with the exterior surface of the tire. In these devices the screw threaded shank is long enough to afford a handle whereby the head is inserted in the tire and also whereby the shank may be rotated to screw home the disk-like nut. This shank is afterwards cut off and filed down to leave a flush exterior surface. The difficulty with these devices is that the nut has to be thin so as not to leave a bump on the thread of the tire when the job is completed. Consequently the number of threads remaining to hold the nut after the shank is cut off are necessarily few and the nipping off and filing down of the shank practically destroys the holding strength of the last half thread or more of the shank.

The object of our invention is, without increasing the thickness of the disk nut, to substantially increase the length of the thread engaging the shank and also to arrange matters so that the nipping off and filing of the shank will not serve to weaken the outermost thread of the shank.

I accomplish this without thickening the disk nut by punching and slightly drawing the metal to form the perforation of the latter before screwthreading it. The punching and drawing serves to present a greater depth of interior surface for screw threading. The resulting interior protrusion or boss of metal around the perforation does no harm because the device is to be used on rubber which can be easily depressed. In fact, the interior projection may be an advantage since in practice it tends to plug the perforation through which the shank is inserted.

Another feature is that the punching is caused to slightly depress the outer surface of the disk nut, thus forming a shallow annular recess. Hence when the shank is cut off flush with said outer surface, there remains a half turn or even a whole turn of thread on the shank exteriorly of the screw threaded perforation, thereby greatly strengthening a half turn or so of shank thread that is in screw threaded engagement with the nut. Moreover, the metal of the shank is more or less deformed or riveted by the nipping and filing operation, and the rivet-like head thus formed is housed in and protected by said annular recess or depression in the outer surface of the disk nut.

The above and other features of my invention may be more fully understood from the following description in connection with the accompanying drawings in which—

Figure 1:
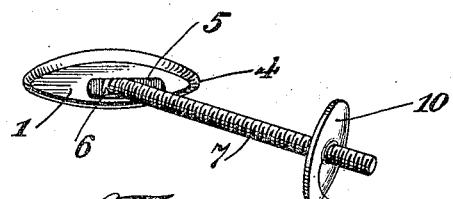
Figure 1 is a perspective view of a complete tire patch of the class described.
Figure 2:
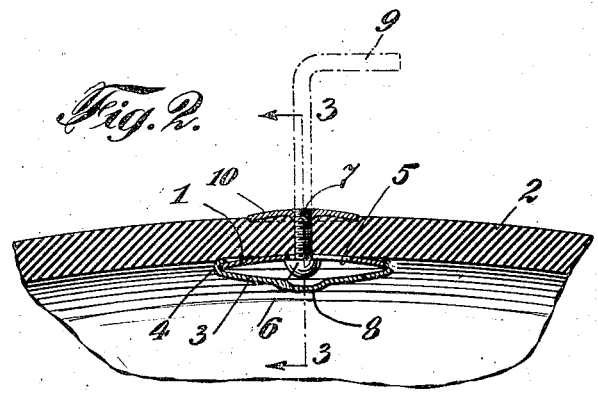
Figure 2 is a sectional view taken in the plane of the tire, showing the tire patch in its final operative position with respect to the tire.
Figure 3:
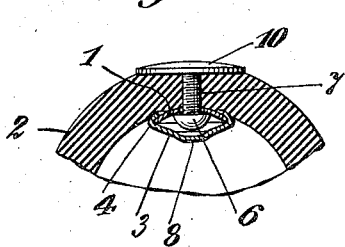
Figure 3 is a section on the line 3—3 Figure 2.

In these drawings the head is shown as comprising a convex stamping 1 for engagement with the inner surface with the tire 2, and the opositely convex stamping 3 secured to 1 by the spun-over edges 4. The stamping 1 has a slot 5 narrow enough to afford a swivel retaining means for the head 6 and wide enough to permit easy play of the screw shank 7, and stamping 3 has a boss 8 to accommodate and center the head 6 of said screw. The screw 7 which is normally straight to permit screwing on of the disk nut 10 may be bent over as indicated in dotted lines Figure 2 to form a handle 9, for rotating the screw after the nut 10 has been screwed into engagement with the tire surface sufficiently to prevent its further easy rotation about the screw. After the screw has been rotated enough to firmly seat the disk nut 10 in clamping engagement with the rubber surface of tire 2 the part of the shank shown in dotted lines of Figure 2 is nipped off and the end may be further filed or riveted flush with the outer surface of nut 10 without weakening the holding power of the end portion of the screw.

Figure 4:
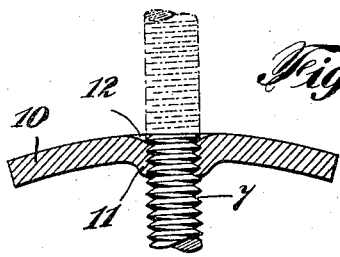
Figure 4 is a detailed section, on a scale considerably enlarged for the purpose of showing my improved disk nut in its relation to the nipped off shank.

By reference to Figure 4 it will be seen that when the disk is punched and drawn in accordance with my present invention, the result is to extrude the projection 11 on the interior and form the annular depression 12 on the exterior and, the original thickness of metal being now presented to the threading tap, at an angle, the total number of threads is slightly increased. Figure 4 also shows how that the shank, even if nipped and filed off perfectly flush with the outer surface of the disk nut 10, will have at least one turn of unmutilated screw thread projecting outside and affording considerable additional protection against stripping. If the nipping or filing off of the shank or subsequent use of the tire operates to spread the metal laterally, it has the effect of a rivet head lying in the annular depression 12, thereby affording still further protection against stripping. The shank is preferably of relatively soft metal, such as brass, to facilitate bending, cutting, filing as above described, and, preferably, the other parts are also of brass to minimize corrosion when in use.

I claim:—

1. A patch clamp comprising a clamping head for engagement with the inner surface of a rubber or similar article; a screw shank of substantially greater length than the thickness of the article, swivelled to said head; and a thin, imperforate disk-like stamping formed as a concave clamping nut screw threaded on said shank and having a smooth clamping rim adapted to engage the outer or working surface of said article, the screw threaded perforation of said nut being formed by punching or drawing from a sheet metal blank of uniform thickness to make the length of said perforation greater than the thickness of the blank.

2. A patch clamp comprising a clamping head for engagement with the inner surface of a rubber or similar article; a screw shank of substantially greater length than the thickness of the article, swivelled to said head; and a thin, imperforate disk-like stamping formed as a concave clamping nut screw threaded on said shank and having a smooth clamping rim adapted to engage the outer or working surface of said article, the screw threaded perforation of said nut being formed by punching or drawing to form an annular protrusion thereof on the clamping face of said stamping.

3. A patch clamp comprising a clamping head for engagement with the inner surface of a rubber or similar article; a screw shank of substantially greater length than the thickness of the article, swivelled to said head; and a thin, disk-like stamping formed as a clamping nut screw threaded on said shank and adapted to engage the outer or working surface of said article, the screw threaded perforation of said nut being formed by punching or drawing to form an annular recess about said perforation depressed below the outer face of said stamping, in which recess the metal of the shank may be laterally displaced.

4. A patch clamp comprising a clamping head for engagement with the inner surface of a rubber or similar article; a screw shank of substantially greater length than the thickness of the article, swivelled to said head; and a thin, disk-like stamping formed as a clamping nut screw threaded on said shank and adapted to engage the outer or working surface of said article, the screw threaded perforation of said nut being formed by punching or drawing to make the length of said perforation greater than the thickness of the stamping; to form an annular protrusion thereof on the clamping face of said stamping and to form an annular recess about said perforation depressed below the outer face of said stamping, into which recess the metal of the shank may be riveted.

Signed at New York in the county of New York and State of New York this 5th day of October, A. D. 1922.

GUSTAVE LEHR.